United States Patent
Dain et al.

(10) Patent No.: US 10,901,942 B2
(45) Date of Patent: Jan. 26, 2021

(54) OFFLOADING DATA TO SECONDARY STORAGE

(71) Applicant: International Business Machines Corporation, Armonk, NY (US)

(72) Inventors: Joseph W. Dain, Vail, AZ (US); Gregory T. Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 15/057,688

(22) Filed: Mar. 1, 2016

(65) Prior Publication Data

US 2017/0255417 A1 Sep. 7, 2017

(51) Int. Cl.
| | | |
|---|---|---|
| *G06F 16/11* | (2019.01) | |
| *G06F 16/185* | (2019.01) | |
| *G06F 16/188* | (2019.01) | |
| *G06F 16/174* | (2019.01) | |
| *H04L 29/08* | (2006.01) | |
| *G06F 3/06* | (2006.01) | |
| *H04L 29/06* | (2006.01) | |
| *G06F 11/14* | (2006.01) | |

(52) U.S. Cl.
CPC ............ *G06F 16/119* (2019.01); *G06F 3/067* (2013.01); *G06F 3/0608* (2013.01); *G06F 3/0641* (2013.01); *G06F 3/0647* (2013.01); *G06F 11/1453* (2013.01); *G06F 11/1469* (2013.01); *G06F 16/1744* (2019.01); *G06F 16/1748* (2019.01); *G06F 16/185* (2019.01); *G06F 16/188* (2019.01); *H04L 67/1097* (2013.01); *H04L 69/04* (2013.01)

(58) Field of Classification Search
CPC .. G06F 3/0647; G06F 17/30079; G06F 3/067; G06F 16/1748; G06F 16/188; G06F 3/0641; G06F 3/0608; G06F 11/1453; G06F 11/1469; G06F 16/1744; H04L 67/1097
USPC .......................................... 709/217
See application file for complete search history.

(56) References Cited

U.S. PATENT DOCUMENTS

| | | |
|---|---|---|
| 9,087,011 B2 | 7/2015 | Anglin et al. |
| 9,128,948 B1 | 9/2015 | Raorane |
| 2010/0274772 A1* | 10/2010 | Samuels ............... G06F 16/188 707/693 |
| 2012/0109897 A1* | 5/2012 | Janakiraman ....... G06F 11/1466 707/660 |
| 2016/0306560 A1* | 10/2016 | Maranna ................. G06F 3/067 |
| 2016/0371295 A1* | 12/2016 | Aronovich ............ G06F 16/162 |
| 2017/0123678 A1* | 5/2017 | Singhai ............... G06F 12/0246 |
| 2018/0253251 A1* | 9/2018 | Hayasaka ............... H03M 7/30 |

* cited by examiner

*Primary Examiner* — Emmanuel L Moise
*Assistant Examiner* — Xiang Yu
(74) *Attorney, Agent, or Firm* — Kunzler Bean & Adamson

(57) ABSTRACT

For offloading data to secondary storage, a criteria module checks a migration criteria of a data segment stored in a first data repository. The data segment may be associated with one or more entities. A threshold module determines whether the migration criteria of the data segment satisfies a migration threshold. A migration module migrates the data segment to a second data repository in response to the migration criteria of the data segment satisfying the migration threshold.

20 Claims, 6 Drawing Sheets

OFFLOADING DATA TO SECONDARY STORAGE

FIELD

The subject matter disclosed herein relates to data storage and more particularly relates to offloading data to secondary storage.

BACKGROUND

Organizations can store data on local data storage systems and may utilize remote data storage systems for backup, disaster recovery, etc. For example, an online retailer may store customer data on a plurality of locally-hosted servers, while storing backup copies of the data on a remote data center in the "cloud." Often, data located on the local storage system can become stale. In other words, the data may not be referenced very often as it ages over time. Such data is typically consuming storage capacity that might otherwise be used more effectively by data that is accessed heavily and/or data that may contribute to the storage efficacy of the data storage system.

BRIEF SUMMARY

A method for offloading data to secondary storage is disclosed. An apparatus and computer program product also perform the functions of the method. An apparatus, in one embodiment, includes a criteria module that checks a migration criteria of a data segment stored in a first data repository. The data segment may be associated with one or more entities. The apparatus, in some embodiments, includes a threshold module that determines whether the migration criteria of the data segment satisfies a migration threshold. In another embodiment, the apparatus includes a migration module that migrates the data segment to a second data repository in response to the migration criteria of the data segment satisfying the migration threshold.

In some embodiments, the data segment comprises a compressed data segment. The compressed data segment may be migrated to the second data repository in its compressed format. In one embodiment, the migration module copies the data segment to a file in response to the threshold module determining the migration criteria of the data segment satisfies the migration threshold. In various embodiments, a plurality of data segments are grouped in the file according to an entity that references the data segments. The one or more entities may include one or more virtual entities. In some embodiments, the migration module migrates the file to the second data repository in response to a size of the file satisfying a size threshold. In certain embodiments, the migration module migrates the file to the second data repository in response to a storage capacity condition associated with the first data repository.

In one embodiment, the apparatus includes a location module that updates a pointer of an entity associated with the data segment in response to the data segment being migrated to the second data repository and deleted from the first data repository such that the pointer points to a location of the data segment on the second data repository. In a further embodiment, the criteria module checks the migration criteria of a data segment during defragmentation of one or more storage media of the first data repository. In various embodiments, the criteria module checks the migration criteria of data segments stored in the first data repository on a per-entity basis such that one or more data segments associated with an entity are migrated to the second data repository while maintaining the association with the entity.

In one embodiment, the migration criteria is based on a data reduction ratio of the first data repository. In some embodiments, the migration criteria comprises one or more of a reference count of the data segment and an age of the data segment. In a further embodiment, the apparatus includes an exclusion module that tags a data segment stored on the first data repository as being excluded from migration to the second data repository. In a further embodiment, at least a portion of the criteria module, the threshold module, and the migration module comprise one or more of hardware and executable code, the executable code stored on one or more computer readable storage media.

A method, in one embodiment, includes checking a migration criteria of a data segment stored in a first data repository. The data segment may be associated with one or more entities. The method, in some embodiments, includes determining whether the migration criteria of the data segment satisfies a migration threshold. In another embodiment, the method includes migrating the data segment to a second data repository in response to the migration criteria of the data segment satisfying the migration threshold.

In one embodiment, the data segment comprises a compressed data segment. The compressed data segment may be migrated to the second data repository in its compressed format. The method, in one embodiment, includes copying the data segment to a file in response to determining the migration criteria of the data segment satisfies the migration threshold. In some embodiments, a plurality of data segments are grouped in the file according to an entity that references the data segments. The one or more entities may include one or more virtual entities. In a further embodiment, the method includes migrating the file to the second data repository in response to a size of the file satisfying a size threshold. In one embodiment, the migration criteria comprises one or more of a reference count of the data segment and an age of the data segment.

A computer program product, in one embodiment, includes a computer readable storage medium having program instructions embodied therewith. The program instructions, in certain embodiments, are readable/executable by a processor to cause the processor to check, by processor, a migration criteria of a data segment stored in a first data repository. The data segment may be associated with one or more entities. The program instructions, in some embodiments, are readable/executable by a processor to determine, by processor, whether the migration criteria of the data segment satisfies a migration threshold. In a further embodiment, the program instructions are readable/executable by a processor to cause the processor to migrate, by processor, the data segment to a second data repository in response to the migration criteria of the data segment satisfying the migration threshold.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
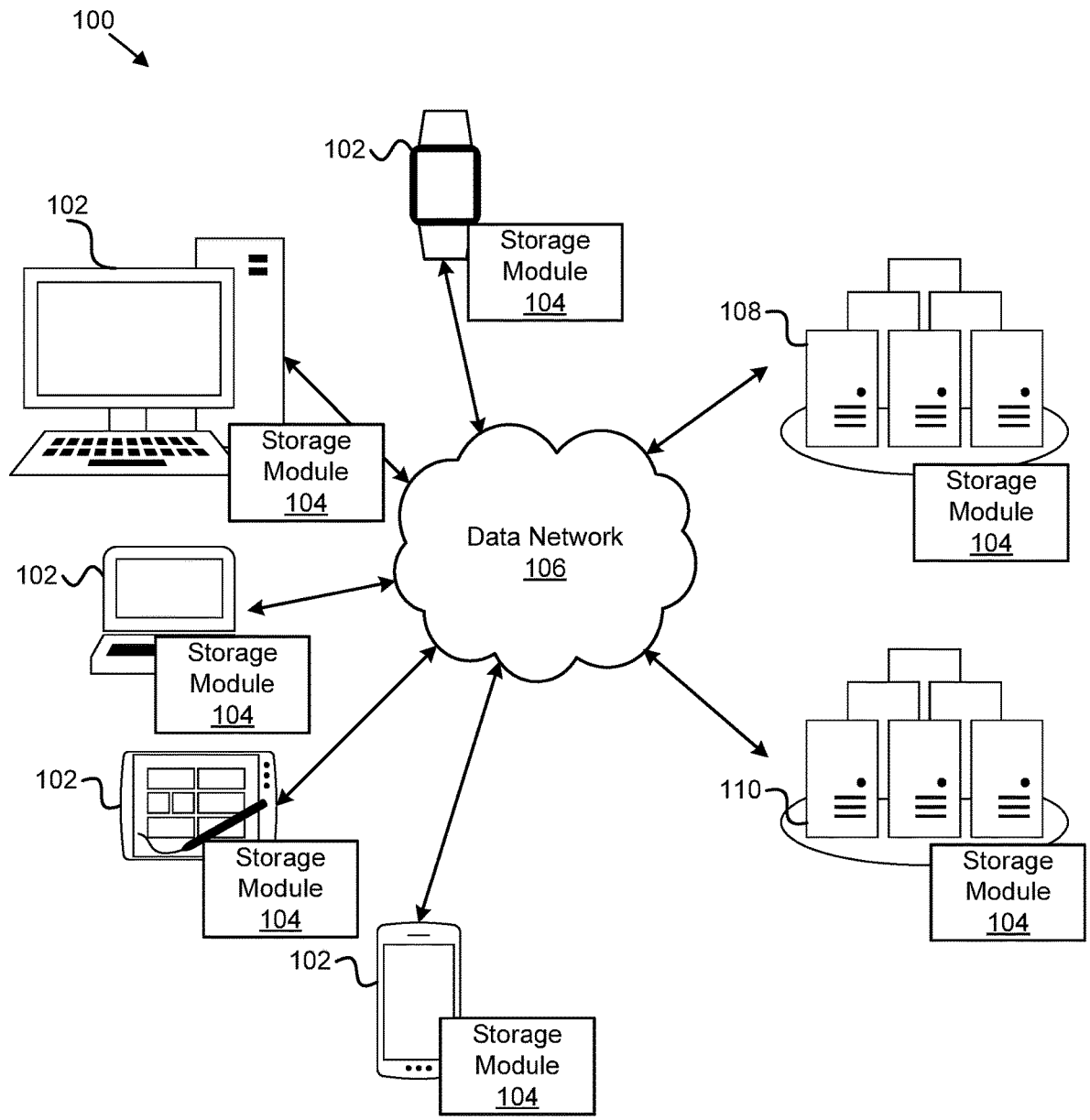
FIG. 1 is a schematic block diagram illustrating one embodiment of a system for offloading data to secondary storage.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 depicts one embodiment of a system 100 for offloading data to secondary storage. In one embodiment, the system 100 includes one or more information handling devices 102, one or more storage modules 104, one or more data networks 106, one or more primary data repositories 108, and/or one or more secondary data repositories 110. In certain embodiments, even though a specific number of information handling devices 102, storage modules 104, data networks 106, primary data repositories 108, and secondary data repositories 110 are depicted in FIG. 1, one of skill in the art will recognize, in light of this disclosure, that any number of information handling devices 102, storage modules 104, data networks 106, primary data repositories 108, and secondary data repositories 110 may be included in the system 100 for offloading data to secondary storage.

In one embodiment, the system 100 includes one or more information handling devices 102. The information handing devices 102 may include one or more of a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the information handling devices 102 are communicatively coupled to a primary data repository 108 and/or a secondary data repository 110 via a data network 106, described below. The information handling devices 102, in a further embodiment, are capable of executing various programs, program code, applications, instructions, functions, or the like, which may access, store, download, upload, and/or the like data located on the primary data repository 108 and/or the secondary data repository 110.

In one embodiment, a storage module 104 is configured to check a migration criteria of a data segment stored in a first data repository 108. The data segment may be a compressed data segment associated with one or more entities. The storage module 104, in some embodiments, is configured to determine whether the migration criteria of the data segment satisfies a migration threshold. The storage module 104, in a further embodiment, is configured to migrate the data segment to a second data repository 110 in response to the migration criteria of the data segment satisfying the migration threshold. The data segment may be migrated in its compressed format while maintaining its association with the one or more entities. As used herein, an entity may be a logical storage device, a virtual storage device (e.g., a virtual cartridge, a virtual file, or the like), an application, and/or the like.

The storage module 104 provides a means for detecting a data segment stored on the primary data repository 108 that is a candidate for migration to a secondary data repository 110. For example, if a data segment has a low reference count and/or is older than a predetermined age, and/or the like, the data may be migrated to the secondary data repository 110. Additionally, the data segment may be stored in a compressed format on the primary data repository 108. In such an embodiment, the storage module 104 migrates the data segment to the secondary data repository 110 in its compressed format, without uncompressing the data prior to migration of the data segment, which would necessitate re-compressing the data segment after it is migrated to the secondary data repository 110. This saves bandwidth and traffic on the data network 106 and provides for quick upload and download to/from the secondary data repository 110. The storage module 104, in certain embodiments, migrates data to the secondary data repository 110 in data segments on a per-entity or per-application basis. For example, if a virtual cartridge stores data segments A, B, and C, the storage module 104 stores the data segments A, B, C together such that when the data segments are accessed by the virtual cartridge, they can be accessed together, which improves the speed of the data access. As used herein, a data segment may comprise a block of data, a data object, a file, and/or the like that comprises at least a portion of various types of data such as text files, images, videos, music files, emails, text messages, application data, libraries, source code, and/or the like.

In various embodiments, the storage module 104 may be embodied as a hardware appliance that can be installed or deployed in a primary data repository 108, a secondary data repository 110, on an information handling device 102, or elsewhere on the data network 106. In certain embodiments, the storage module 104 may comprise a hardware device such as a secure hardware dongle or other hardware appliance device (e.g., a set-top box, a network appliance, or the like) that attaches to device of the primary data repository 108, the secondary data repository 110, another information handling device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like), and/or the like. A hardware appliance of the storage module 104 may comprise a power interface, a wired and/or wireless network interface, a graphical interface that attaches to a display, and/or a semiconductor integrated circuit device as described below, configured to perform the functions described herein with regard to the storage module 104.

The storage module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, the storage module 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the storage module 104.

The semiconductor integrated circuit device or other hardware appliance of the storage module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of the security module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The primary data repository 108, in one embodiment, may comprise one or more servers, or other data storage devices, that include volatile and non-volatile storage media for storing data. The data may include documents, images, videos, audio files, metadata, or the like. The data may be stored in a file system, as objects, as blocks, and/or the like. The primary data repository 108 may be located in a data center either on the premises of an organization and/or in the cloud such that data is accessed via a data network 106 like the Internet. The primary data repository 108, in one embodiment, is the primary data storage point for one or more entities, applications, programs, and/or the like for storage and access of data used by the one or more entities, applications, programs, and/or the like. The data stored on the primary data repository 108 may be stored in a compressed format, e.g., the data may be compressed using various data compression methods such as data deduplication.

Similarly, the secondary data repository 110 may comprise one or more servers, or other storage devices, that include volatile and non-volatile storage media for storing data. The data may include documents, images, videos, audio files, metadata, or the like. The data may be stored in a file system, as objects, as blocks, and/or the like. The secondary data repository 110 may store data received from the primary data repository 108, e.g., the data may be "pushed," automatically or manually, from the primary data repository 108 to the secondary data repository 110. The secondary data repository 110 may be located in a data center either on the premises of an organization and/or in the cloud such that data is accessed via a data network 106 like the Internet. The secondary data repository 110, in one embodiment, is configured as a backup storage system, a disaster recovery system, a data restore system, and/or the like.

Together, the primary data repository 108 and the secondary data repository 110 may comprise a hybrid cloud storage system. For example, the primary data repository 108 may be a private cloud storage system located on the premises of a company, and the secondary data repository 110 may be a public cloud storage system (e.g., Amazon S3®, Rackspace®, Softlayer® object storage, etc.). Workloads may be split between the devices of the private and public clouds, a data repository 108, 110 may be split between the public and private clouds, workloads and/or data may be manually or automatically shifted between the public and private clouds, and/or the like. As described below, migrating data between the primary data repository 108 and the secondary data repository 110 is done transparent to an application that is using the data such that the application is unaware that data is being moved between the data repositories 108, 110. In one embodiment, the primary data repository 108 and the secondary data repository 110 are part of a deduplication gateway system, such as ProtecTIER® from IBM® of Armonk, N.Y.

Figure 2:
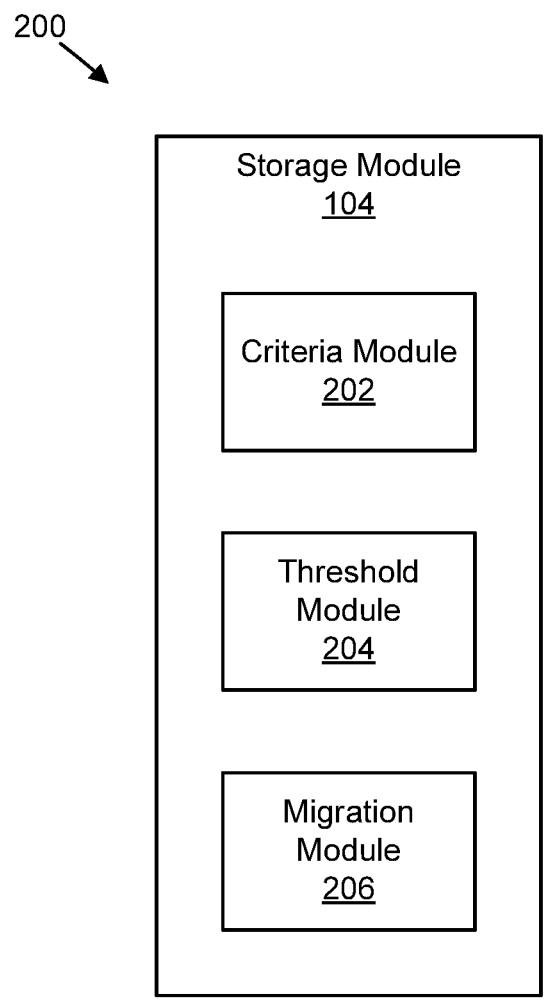
FIG. 2 is a schematic block diagram illustrating one embodiment of a module for offloading data to secondary storage.

FIG. 2 depicts one embodiment of a module 200 for offloading data to secondary storage. In one embodiment, the module 200 includes an instance of a storage module 104. The storage module 104, in one embodiment, includes one or more of a criteria module 202, a threshold module 204, and a migration module 206, which are described in more detail below.

The criteria module 202, in one embodiment, checks a migration criteria of a data segment stored in a first data repository, which may be the primary data repository 108. The migration criteria for a data segment may include a reference count for the data segment. The reference count, as used herein, may be a count of how many times a data segment is referenced (e.g., pointed to, associated with, related to, or the like) by other objects in the primary data repository 108, which may be used to verify that a unique instance of each data segment is stored on the primary data repository 108 instead of storing multiple copies of the same data segment. The reference count may be a total reference count since the data segment was created or stored in the primary data repository 108. In some embodiments, the reference count may be a number of times that the data segment has been referenced for a period of time, e.g., within the last week, the last month, the last year, or the like.

In a further embodiment, the migration criteria for a data segment may include an age of the data segment. The age of the data segment may be the age since the data segment was created, the age since the data segment was stored on the primary data repository 108, the age since the data segment was most recently used by an application (e.g., age since the data segment was most recently read or accessed), and/or the like. Other migration criteria may include a data reduction ratio of the primary data repository 108, a storage capacity of the primary data repository 108, and/or the like. As used herein, a data reduction ratio may comprise a combination of a data deduplication ratio and a compression ratio, e.g., data reduction ratio=data deduplication ratio+compression ratio= (total storage capacity/deduplicated storage amount)+(total storage capacity/compressed storage amount). For example, the data reduction ratio may be 5:1, 10:1, 20:1, and so on for a storage medium, a data center, a server rack, and/or the like. Furthermore, the data reduction ratio may be calculated on a per-data segment basis. Thus, when the data reduction ratio is exceeded, meaning that the storage medium has a data reduction ratio less than the threshold data reduction ratio, the criteria module 202 may check a migration criteria for one or more data segments. In another example, if the storage capacity of the primary data repository 108 is low, data segment A may be a candidate for migration to the secondary storage repository 110 even if a reference count and/or an age of data segment A does not satisfy a migration threshold. Similarly, if data segment A achieves a data reduction ratio in the primary data repository 108 less than a threshold data reduction ratio, data segment A may be a candidate for migration to the secondary storage repository 110.

In one embodiment, the threshold module 204 determines whether the migration criteria determined by the criteria module 202 satisfies a migration threshold. The migration threshold may be a number of references for a data segment, an age of a data segment, a capacity threshold for one or more storage devices of the primary data repository 108, a data reduction ratio threshold for the primary data repository 108, and/or the like. The threshold values may be defined by a user, based on configuration of one or more storage devices, based on a backup schedule, based on a disaster recovery system, and/or the like. For example, an administrator may specify that the primary data repository 108 maintain a capacity of 90% or less while maintaining a defined data reduction ratio. Thus, in one embodiment, the threshold module 204 compares the determined migration criteria to one or more predefined thresholds to determine if the migration criteria for a data segment satisfies a migration threshold.

In some embodiments, the threshold module 204 determines whether a plurality of migration criteria for a data segment satisfies a migration threshold before the data segment can be migrated to the secondary data repository 110. For example, even if the threshold module 204 determines that the reference count of a data segment is below a reference count threshold, if the capacity of the primary data repository 108 does not exceed a capacity threshold, the data segment may not be tagged or marked as a candidate for migration to the secondary data repository 110.

The migration module 206, in one embodiment, migrates a data segment to a second data repository, e.g., a secondary data repository 110, in response to the threshold module 204 determining that the migration criteria for the data segment satisfies a migration threshold. In one embodiment, the migration module 206 migrates a data segment in its compressed format. For example, if data segments are stored in the primary data repository 108 using a data deduplication compression method, the migration module 206 may migrate the data segments from the primary data repository 108 in its deduplicated format. In such an embodiment, the migration module 206 also migrates compression metadata along with the data segment. In this manner, the data segment does not have to be uncompressed or "rehydrated" prior to migrating the data segment, and then re-compressed before the data segment is stored on the secondary data repository 110. This also reduces the bandwidth used to transmit the data segment from the primary data repository 108 to the secondary data repository 110.

As described above, the data segments stored on the primary data repository 108 may be associated with one or more entities, such as virtual cartridges, virtual files, virtual objects, etc. Accordingly, the criteria module 202 may check migration criteria for data segments on a per-entity basis. In other words, for each entity, the criteria module 202 may check the migration criteria of data associated with a first entity, and then a second entity, and so on. In this manner, the migration module 206 migrates data segments while maintaining the data segment's association with an entity. This may allow the data for an entity to be accessed and retrieved quickly from the secondary data repository 110 because the data can be accessed in sequential chunks.

In some embodiments, the migration module 206 migrates data segments directly from the primary data repository 108 to the secondary data repository 110 over the data network 106. In certain embodiments, the migration module 206, copies a data segment to a file prior to migrating the data segment to the secondary data repository 110. In such an embodiment, the migration module 206 does not migrate the data directly to the secondary data repository 110, but instead copies the data to a file, which is subsequently transferred to the secondary data repository 110. In such an embodiment, the migration module 206 may create a file and copy data segments that have been marked as candidates for migration to the file. Once the size of the file reaches a predetermined size or satisfies a size threshold, the migration module 206 migrates the file to the secondary data repository 110.

As discussed above, because the criteria module 202 performs the migration criteria check for data segments on a per-entity basis (e.g., per virtual cartridge), the data within the file is grouped per entity so that data accesses from the file after it is migrated to the secondary data repository 110. In some embodiments, if copying the data segments for an entity to the file would cause the file to exceed the predefined size of the file, the migration module 206 may create a new or additional file of a predefined size to copy the data segments to so that the data segments for an entity are not spread out over multiple files. In certain embodiments, the migration module 206 may delete the data segments from the primary data repository 108 after the data segments are migrated directly to the secondary data repository 110 or copied to the file that will be migrated to the secondary data repository 110. In certain embodiments, the migration module 206 creates a new file for each entity such that only data segments for a particular entity are stored in the file and migrated.

In one embodiment, the migration module 206 may migrate the file before it has reached the predefined size if the capacity threshold of the of the primary data repository 108 has been satisfied. In some embodiments, if data segments that have been copied to the file are referenced such that the reference count of the data segments satisfies the reference count threshold, the migration module 206 may remove the data segments being referenced from the file and back into the primary data repository 108 before the file is migrated to the secondary data repository 110. For example, the migration module 206 may copy data segment A to a file because data segment A only has 10 references, and the reference count threshold to remain in the primary data repository 108 is 20 references. If, after the migration module 206 copies data segment A to the file, data segment A is referenced 10 times, e.g., the data segment is pointed to, referred to, associated with, and/or the like by an entity like a virtual cartridge, 10 times, before the file is migrated to the secondary storage repository 110, the migration module 206 may copy data segment A back into the primary data repository 108 and delete the copy of data segment A from the file.

Similarly, if a data segment that is stored in the secondary data repository 110 becomes highly referenced such that the reference count of the data segment satisfies the reference count threshold, the migration module 206 may migrate the data segment from the secondary data repository 110 back to the primary data repository 108. As mentioned above, the data segment while being copied and/or migrated between files and data repositories maintains its compressed format such that no additional processing cycles are used to uncompress and re-compress the data before and/or after it is migrated.

In some embodiments, the migration module 206 utilizes various application programming interfaces ("APIs") to migrate data segments, files, objects, of the like, between the primary data repository 108 and the secondary data repository 110. For example, the migration module 206 may use representational state transfer ("REST") APIs to PUT or GET data segments. Other APIs may be provided by the provider of the secondary data repository 110, such as Amazon® or Rackspace®.

In one embodiment, after the migration module 206 migrates and deletes data from the primary data repository 108, the migration module 206 may execute a defragmentation process to reorganize the remaining data in the primary data repository 108 and remove any "holes" in the data storage of the primary data repository 108, as is known in the art. In certain embodiments, the functions performed by the storage module 104 (e.g., checking migration criteria of a data segment, determining if the migration criteria satisfies a migration threshold, and migrating the data segment if the migration threshold is satisfied) can be performed simultaneously or in parallel with other processes, such as a defragmentation process to increase the usable storage space available on the primary data repository 108, a data replication process, a data delete process, a data restore process, a data backup process, and/or the like. The functions performed by the storage module 104 and the defragmentation process may be performed in the background such that an application and/or entity is unaware that data is being migrated or transmitted between the primary data repository 108 and the secondary data repository 110.

After the migration module 206 migrates data segments to the secondary data repository 108, the one or more entities that are associated with the data may have data stored on both the primary data repository 108 and the secondary data repository 110. However, the distinction is transparent to an application using the data and/or an entity that refers to the data such that the application or entity is not aware of where the data is stored.

Figure 3:
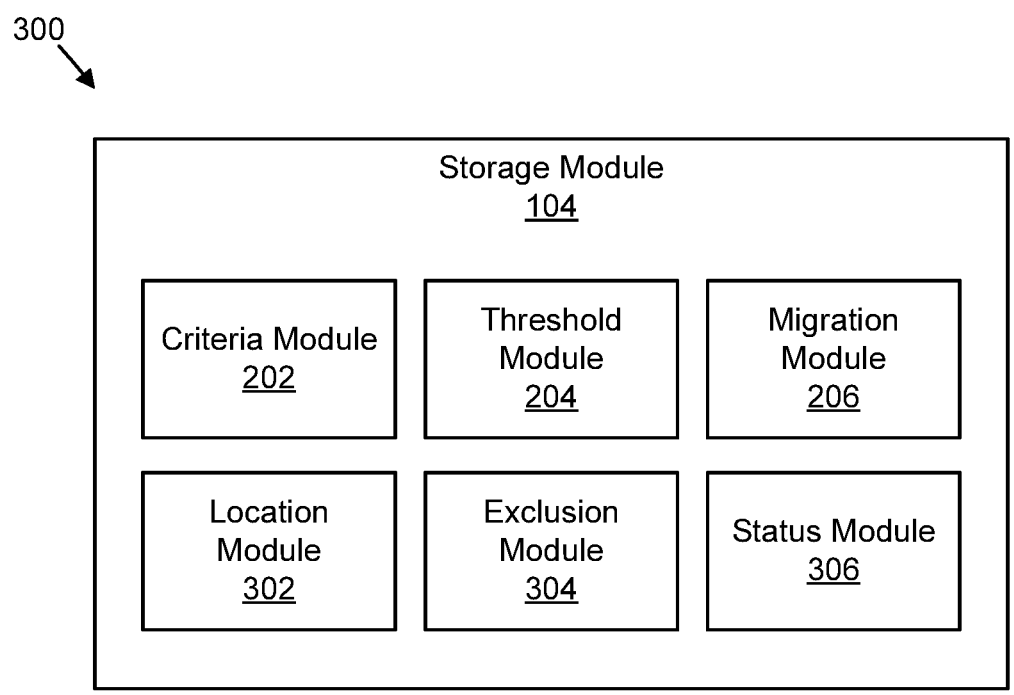
FIG. 3 is a schematic block diagram illustrating one embodiment of a module for offloading data to secondary storage.

FIG. 3 depicts one embodiment of a module 300 for offloading data to secondary storage. The module 300, in one embodiment, includes an embodiment of a storage module 104. The storage module 104, in some embodiments, includes one or more of a criteria module 202, a threshold module 204, and a migration module 206, which may be substantially similar to the criteria module 202, the threshold module 204, and the migration module 206 described above with reference to FIG. 2. Furthermore, the storage module 104 may include one or more of a location module 302, an exclusion module 304, and a status module 306, which are described in more detail below.

Figure 4:
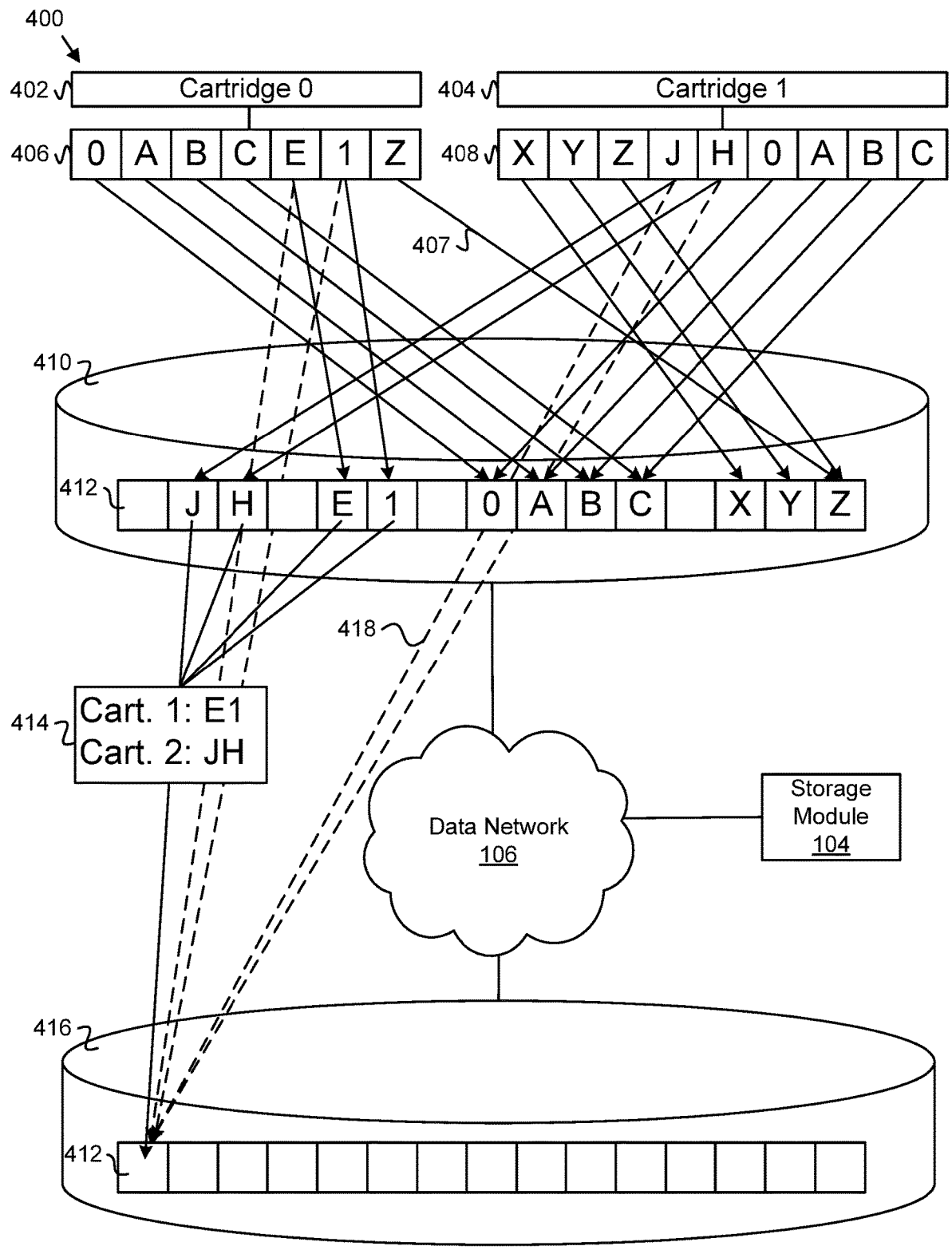
FIG. 4 depicts one embodiment of offloading data to secondary storage.

The location module 302, in one embodiment, is configured to update a pointer of an entity associated with a migrated data segment in response to the data segment being migrated to the secondary data repository 110 such that the pointer points to the new location of the data segment on the secondary data repository 110. In certain embodiments, a pointer to the data segment for each entity is updated to point to the new location of the data segment on the secondary data repository 110. In some embodiments, an entity, such as a virtual cartridge, may include a map, a table contents, or the like, that includes a plurality of pointers where each pointer points to the first data element of a data segment, as shown in FIG. 4. Accordingly, the location module 302 updates the pointers to different data segments in response to the data segments being migrated between the primary data repository 108 and the secondary data repository 110.

In one embodiment, the exclusion module 304 is configured to tag a data segment stored on the primary data repository 108 as being excluded from migration to the secondary data repository 110. For example, the exclusion module 304 may tag, mark, or otherwise provide an indicator that a data segment should not be migrated to the secondary data repository 110. In some embodiments, the exclusion module 204 tags a data segment as being excluded from migration in response to a user, an application, an entity, or the like, specifying which data should remain in the primary data repository 108. In this manner, the storage module 104 will ignore marked data segments and not attempt to determine whether the marked data segments are eligible candidates for migration.

In one embodiment, the status module 306 provides a status update to a user, an application, an entity, or the like, regarding the status of the data in the primary data repository 108 and the secondary data repository 110. For example, the status module 306 may present to a user, such as an administrator, within an interface the locations of data segments associated with different applications and entities, the percentages of data stored in the primary data repository 108 and the secondary data repository 110, specific blocks of the data stored in the primary data repository 108 and the secondary data repository 110, which applications and/or entities use which data, and/or the like. The status module 306 may also provide status notifications, updates, alerts, and/or the like regarding the state of the primary data repository 108 and the secondary data repository 110. For example, the status module 306 may alert a system administrator that the primary data repository 108 is reaching the predefined capacity threshold. In response to the alert, the system administrator may manually trigger the data migration process of the storage module 104 and/or change the migration thresholds to trigger migration of data from the primary data repository 108 to the secondary data repository 110.

FIG. 4 depicts one embodiment of a system 400 of offloading data to secondary storage. In the depicted embodiment 400, two virtual cartridges are illustrated, cartridge 0 402 and cartridge 1 404. In some embodiments, the virtual cartridges 402, 404 are associated with one or more data segments 412 stored in the primary data repository 410. The virtual cartridges 402, 404, for example, may each have a corresponding table of contents, 406, 408 of a plurality of pointers 407 that point to the data segments 412 that are stored in the primary data repository 410.

In one embodiment, the storage module 104 is located on the primary data repository 410, the secondary data repository 416, a different server in the system 400, and/or may be a network or hardware appliance connected to the system 400. The primary data repository 410 may be embodied as a private cloud and the secondary data repository 416 may be embodied as a public cloud, and the repositories 410, 416 may be connected to each other over a data network 106. Each of the data repositories 410, 416 may be embodied as deduplication data repositories such that the data stored in the repositories 410, 416 is stored in a compressed format using data deduplication such that each virtual cartridge 402, 404 points to a single instance of a data segment 412, and not to multiple copies of the same data segment 412. For example, cartridge 0 402 and cartridge 1 404 both have pointers 407 that point to a single instance of the data segment 412 "A."

The criteria module 202 may actively check the data segments 412 in the primary data repository 410 to determine whether any of the data segments 412 are eligible candidates for data migration to the secondary data repository 416. In the depicted embodiment, after the criteria module 202 checks the migration criteria for the data segments 412, the threshold module 204 may determine that the data segments 412 "E," "1," "J," and "H" have migration criteria that satisfies a migration threshold. For example, the data segments 412 "E," and "1" may have a reference count less than a threshold reference count, meaning that each data segment 412 is not pointed to, referred to, associated with, or the like by an entity, such as a virtual entity, enough times to satisfy the threshold reference count. Similarly, the data segments 412 "J" and "H" may be older than an age threshold.

Accordingly, the migration module 206 may copy the data segments 412 "E," "1," "J," and "H" to a file 414, which the migration module 206 subsequently migrates to the secondary data repository 416 in response to the size of the file 414 satisfying a file size threshold. In some embodiments, the migration module 206 may migrate data segments 412 directly to the secondary data repository 416 without first copying the data segment 412 to a file 414. In response to migration module 206 migrating the file 414 to the secondary data repository 416, the location module 302 may update the pointers 418 of the table of contents that previously pointed to the locations of the data segments 412 "E," "1," "J," and "H" in the primary data repository 410 to point to the location of the file 414 in the second data repository 416.

In some embodiments, the migration module 206 copies the data from the file 414 to the secondary data repository 416, instead of storing the file 414 in the repository 416. In such an embodiment, the location module 302 updates the pointers 418 to point to the respective locations of the data segments 412 "E," "1," "J," and "H" in the secondary data repository 416. The storage module 104, in certain embodiments, checks the data segments 412 in the primary data repository 410 on a per-entity basis. In other words, the criteria module 402, the threshold module 404, and the migration module 406 execute on data associated with cartridge 0 402 first, and then cartridge 1 404, and so on. In this manner, the data segments 412 that are migrated to the second data repository 416 are chunked together based on the entity 402, 404 that is associated with the data segments 412, which may provide quicker access for an entity 402, 404 to the data segments 412 from the secondary data repository 416. Furthermore, the migration module 206 migrates data segments 412 from the first data repository 410 to the second data repository 416, and vice versa, while maintaining the compressed format of the data segments 412. Thus, the migration module 206 does not un-compress the data segments 412 prior to migrating the data segments 412.

Figure 5:
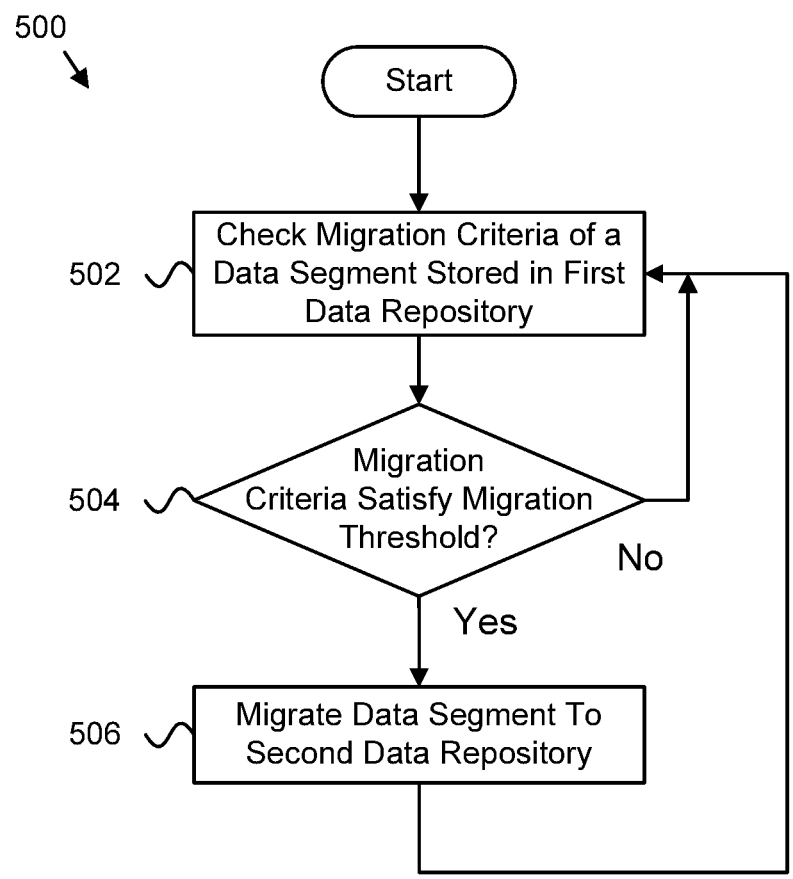
FIG. 5 is a schematic flow chart diagram illustrating one embodiment of a method for offloading data to secondary storage.

FIG. 5 depicts one embodiment of a method 500 for offloading data to secondary storage. In one embodiment, the method 500 begins and the criteria module 202 checks 502 a migration criteria of a data segment stored in a first data repository 108. In some embodiments, the data segment is a compressed data segment associated with one or more entities. In a further embodiment, the threshold module 204 determines 504 whether the migration criteria of the data segment satisfies a migration threshold. If the threshold module 204 determines 504 that the migration criteria of the data segment satisfies a migration threshold, the migration module 206 migrates 506 the data segment to a second data repository 110 in its compressed format while maintaining its associated with the one or more entities. If the threshold module 204 determines 204 that the migration criteria for the data segment does not satisfy the migration threshold, or after the migration module 206 migrates 506 the data segment, the criteria module 502 continues to check migration criteria for one or more different data segments. The method 500 may continue to process the data in the first data repository 108 to maintain a capacity level of the first data repository 108, a data reduction ratio for the first data repository 108, and/or the like.

Figure 6:
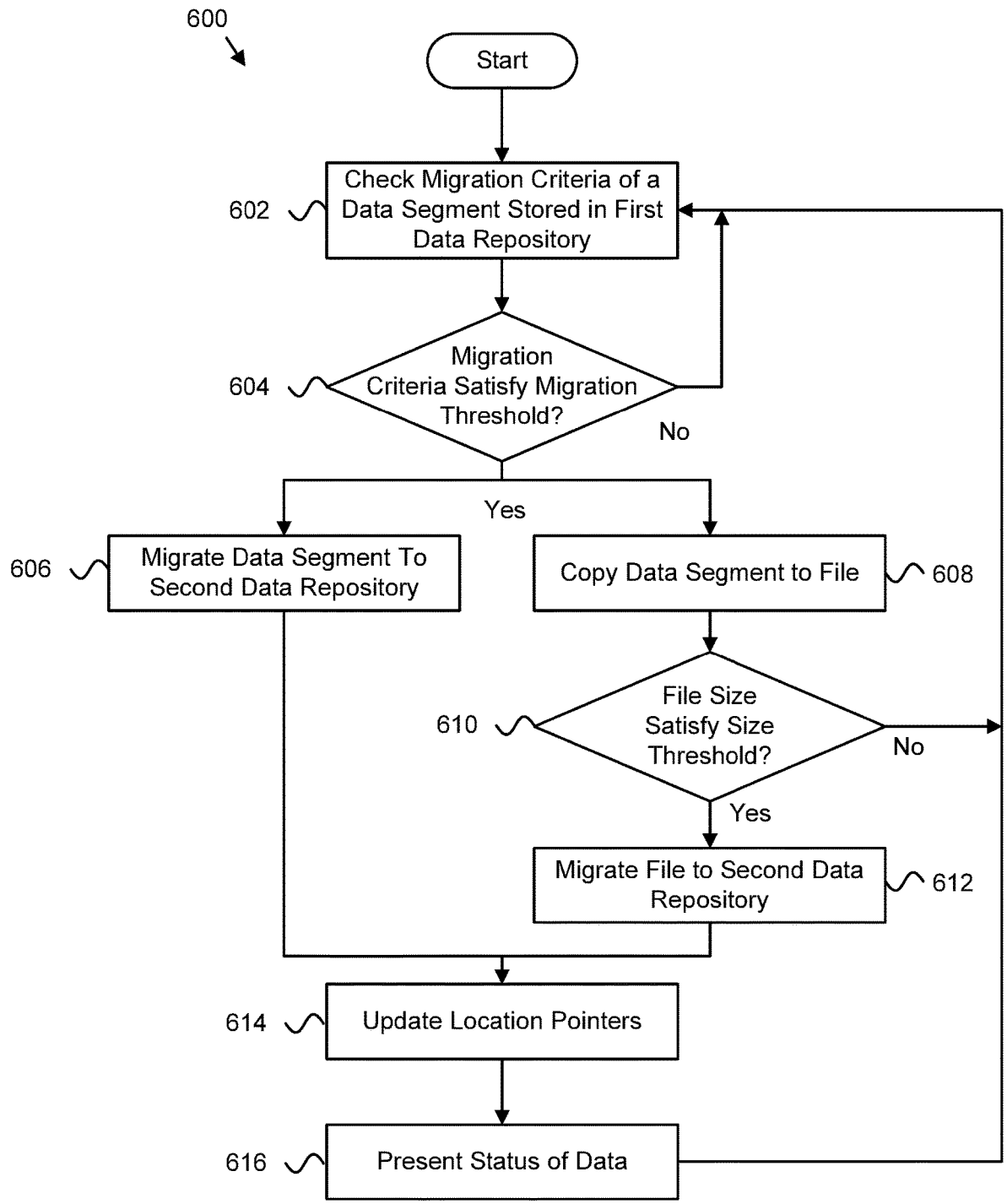
FIG. 6 is a schematic flow chart diagram illustrating one embodiment of a method for offloading data to secondary storage.

FIG. 6 depicts one embodiment of a method 600 for offloading data to secondary storage. In one embodiment, the method 600 begins and the criteria module 202 checks 602 a migration criteria of a data segment stored in a first data repository 108. In some embodiments, the data segment is a compressed data segment associated with one or more entities. In a further embodiment, the threshold module 204 determines 604 whether the migration criteria of the data segment satisfies a migration threshold.

In one embodiment, if the threshold module 204 determines 604 that the migration criteria of the data segment satisfies a migration threshold, the migration module 206 migrates 606 the data segment to the second data repository 110. In some embodiments, if the threshold module 204 determines 604 that the migration criteria of the data segment satisfies a migration threshold, the migration module 206 copies 608 the data segment to a file. Otherwise, the criteria module 202 checks 602 the migration criteria of a different data segment stored in the first data repository 108. In one embodiment, if the migration module 206 determines 610 the size of the file satisfies a file size threshold, the migration module 206 migrates 612 the file to the second data repository 110. Otherwise, the criteria module 202 checks 602 the migration criteria of a different data segment stored in the first data repository 108.

In some embodiments, the location module 302 updates 614 one or more location pointers for an entity associated with the data segment such that the pointers point to the location of the data segment on the second data repository 110 instead of the previous location of the data segment on the first data repository 108. The status module 306 may present 616 the status of the data to a user, an application, an entity, and/or the like. As with the method 500 depicted in FIG. 5, the method 600 may continue to process the data in the first data repository 108 to maintain a capacity level of the first data repository 108, a data reduction ratio for the first data repository 108, and/or the like.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a criteria module that checks a migration criteria of a data segment stored in a first data repository in response to a data reduction ratio of a storage medium where the data segment is stored satisfying a data reduction ratio threshold, the data reduction ratio comprising a combination of a deduplication ratio and a compression ratio for data segments stored on the storage medium, the migration criteria comprising a reference count for the data segment, the reference count comprising a number of times that a virtual storage device references the data segment, the data segment associated with one or more entities;
   a threshold module that determines whether the migration criteria of the data segment satisfies a migration threshold, the migration threshold comprising a threshold reference count such that the migration threshold is satisfied if the reference count for the data segment is less than the threshold reference count; and
   a migration module that:
      copies the data segment to a file in response to the reference count of the data segment being less than the threshold reference count;
      deletes the data segment from the first data repository in response to the data segment being copied to the file;
      in response to the reference count of the data segment satisfying the threshold reference count while the data segment is still stored in the file and prior to the file being migrated to a second data repository, copies the data segment back to the first data repository and removes the data segment from the file;
      otherwise, migrates the file to the second data repository in response to a size of the file satisfying a size threshold, the data segment in the file accessible to the virtual storage device while it is stored on the second data repository;
      and
      migrates the data segment from the second data repository back to the first data repository in response to the reference count for the data segment satisfying the threshold reference count while the data segment is stored in the file on the second data repository,
   wherein said modules comprise one or more of hardware circuits, programmable hardware devices, and a processor executing code.

2. The apparatus of claim 1, wherein the data segment comprises a compressed data segment, the compressed data segment being migrated to the second data repository in its compressed format.

3. The apparatus of claim 1, wherein a plurality of data segments are grouped in the file according to an entity that references the data segments, the one or more entities comprising one or more virtual entities.

4. The apparatus of claim 1, wherein the migration module migrates the file to the second data repository in response to a storage capacity condition associated with the first data repository.

5. The apparatus of claim 1, further comprising a location module that updates a pointer of an entity associated with the data segment in response to the data segment being migrated to the second data repository and deleted from the first data repository such that the pointer points to a location of the data segment on the second data repository.

6. The apparatus of claim 1, wherein the criteria module checks the migration criteria of data segments stored in the first data repository on a per-entity basis such that one or more data segments associated with an entity are migrated to the second data repository while maintaining the association with the entity.

7. The apparatus of claim 1, wherein the migration criteria is further based on the data reduction ratio of the first data repository.

8. The apparatus of claim 1, wherein the migration criteria further comprises an age of the data segment.

9. The apparatus of claim 1, further comprising an exclusion module that tags a data segment stored on the first data repository as being excluded from migration to the second data repository.

10. The apparatus of claim 1, wherein the reference count comprises a total reference count since the data segment was stored in the first data repository.

11. The apparatus of claim 1, wherein the reference count comprises a number of times that the data segment has been referenced within a period of time.

12. The apparatus of claim 1, wherein the migration threshold is further determined based on a maximum capacity level of the first data repository while maintaining the data reduction ratio.

13. The apparatus of claim 1, wherein the threshold module determines whether each of a plurality of migration criteria for a data segment satisfies a migration threshold before the data segment can be migrated to the secondary data repository.

14. The apparatus of claim 1, wherein the migration module:
groups data segments in the file on a per-entity basis; and
copies the data segments for an entity to a new file in response to determining that copying a data segment associated with the entity causing the file to exceed a predefined size of the file.

15. The apparatus of claim 1, wherein the migration module:
creates a new file for each entity associated with a data segment that is being migrated; and
copies data segments that are being migrated to a file that corresponds to the entity that the data segment is associated with.

16. A method comprising:
checking a migration criteria of a data segment stored in a first data repository in response to a data reduction ratio of a storage medium where the data segment is stored satisfying a data reduction ratio threshold, the data reduction ratio comprising a combination of a deduplication ratio and a compression ratio for data segments stored on the storage medium, the migration criteria comprising a reference count for the data segment, the reference count comprising a number of times that a virtual storage device references the data segment, the data segment associated with one or more entities;
determining whether the migration criteria of the data segment satisfies a migration threshold, the migration threshold comprising a threshold reference count such that the migration threshold is satisfied if the reference count for the data segment is less than the threshold reference count;
copying the data segment to a file in response to the reference count of the data segment being less than the threshold reference count;
deleting the data segment from the first data repository in response to the data segment being copied to the file;
in response to the reference count of the data segment satisfying the threshold reference count while the data segment is still stored in the file and prior to the file being migrated to a second data repository, copying the data segment back to the first data repository and removes the data segment from the file;
otherwise, migrating the file to the second data repository in response to a size of the file satisfying a size threshold, the data segment in the file accessible to the virtual storage device while it is stored on the second data repository;
and
migrating the data segment from the second data repository back to the first data repository in response to the reference count for the data segment satisfying the threshold reference count while the data segment is stored in the file on the second data repository.

17. The method of claim 16, wherein the data segment comprises a compressed data segment, the compressed data segment being migrated to the second data repository in its compressed format.

18. The method of claim 16, wherein a plurality of data segments are grouped in the file according to an entity that references the data segments, the one or more entities comprising one or more virtual entities.

19. The method of claim 16, wherein the migration criteria further comprises an age of the data segment.

20. A computer program product, the computer program product comprising a computer readable storage medium having program instructions embodied therewith, the program instructions readable/executable by a processor to cause the processor to:
check, by processor, a migration criteria of a data segment stored in a first data repository in response to a data reduction ratio of a storage medium where the data segment is stored satisfying a data reduction ratio threshold, the data reduction ratio comprising a combination of a deduplication ratio and a compression ratio for data segments stored on the storage medium, the migration criteria comprising a reference count for the data segment, the reference count comprising a number of times that a virtual storage device references the data segment, the data segment associated with one or more entities;
determine, by processor, whether the migration criteria of the data segment satisfies a migration threshold, the migration threshold comprising a threshold reference count such that the migration threshold is satisfied if the reference count for the data segment is less than the threshold reference count;
copy, by processor, the data segment to a file in response to the reference count of the data segment being less than the threshold reference count;
delete, by processor, the data segment from the first data repository in response to file comprising the data segment being migrated to the second data repository;
in response to the reference count of the data segment satisfying the threshold reference count while the data segment is still stored in the file and prior to the file being migrated to a second data repository, copy, by processor, the data segment back to the first data repository and removes the data segment from the file;

otherwise, migrate, by processor, the file to the second data repository in response to a size of the file satisfying a size threshold, the data segment in the file accessible to the virtual storage device while it is stored on the second data repository;

and migrate, by processor, the data segment from the second data repository back to the first data repository in response to the reference count for the data segment satisfying the threshold reference count while the data segment is stored in the file on the second data repository.

* * * * *